Inventor
Lloyd Hornbostel

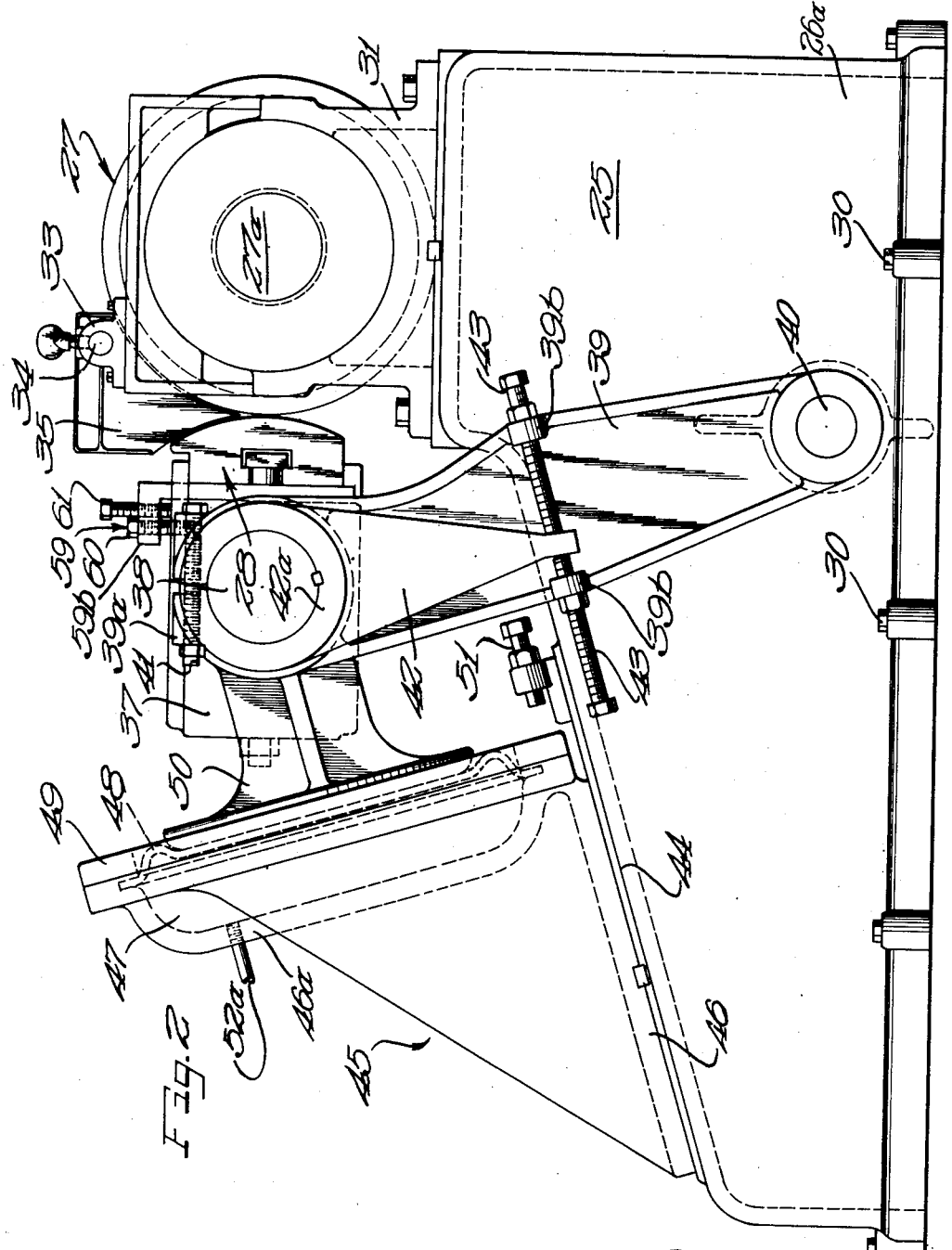

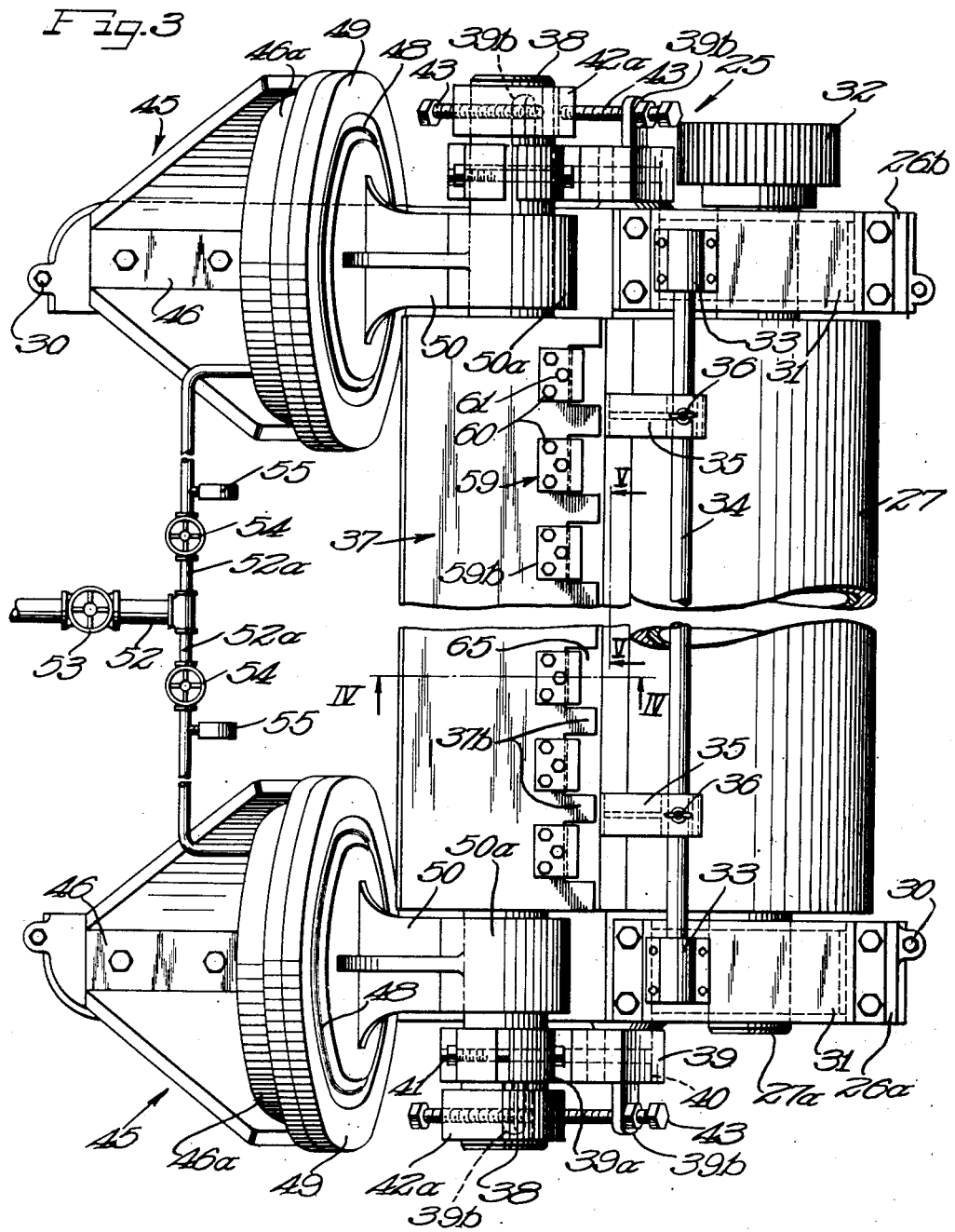

Sept. 8, 1953     L. HORNBOSTEL     2,651,076
THERMOPLASTIC FILM-FORMING MACHINE
Filed Aug. 17, 1949     4 Sheets-Sheet 4
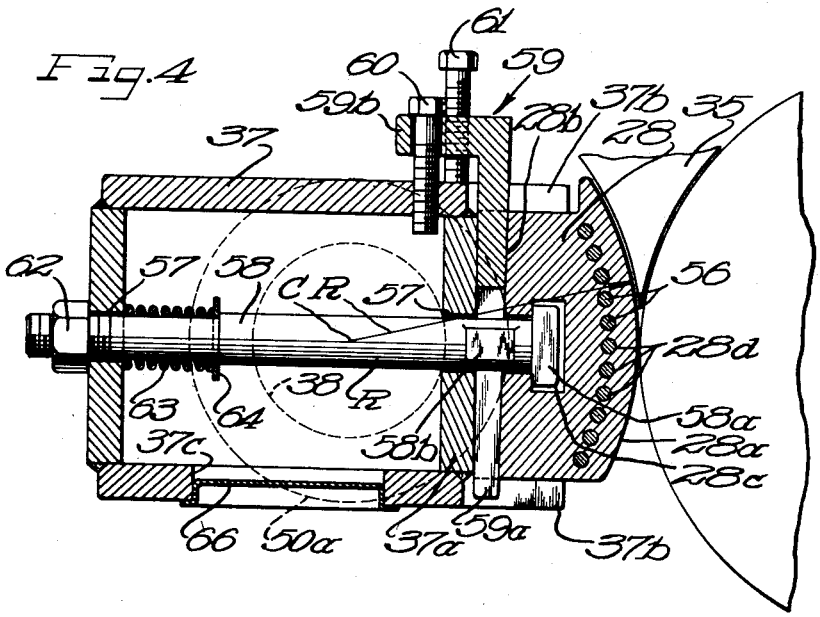
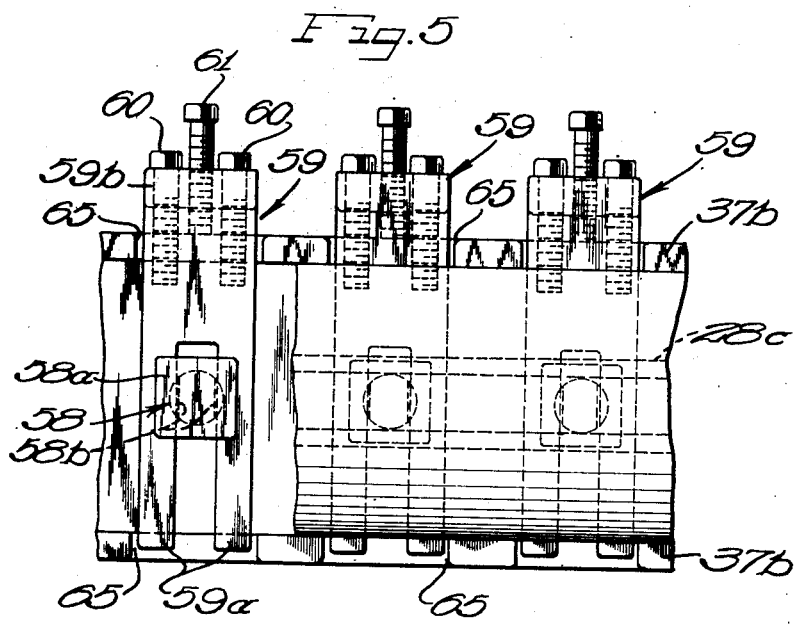
Inventor
Lloyd Hornbostel Patented Sept. 8, 1953

2,651,076

UNITED STATES PATENT OFFICE 2,651,076

THERMOPLASTIC FILM-FORMING MACHINE

Lloyd Hornbostel, Beloit, Wis., assignor to Beloit Iron Works, Beloit, Wis., a corporation of Wisconsin Application August 17, 1949, Serial No. 110,807

13 Claims. (Cl. 18—9)

This invention relates to equipment for making thermoplastic films of relatively high viscosity and for coating such films on flexible web material.

Specifically, the invention deals with a machine for continuously forming a film of thermoplastic material from a hot mass of the material, which machine is adapted to produce a self-sustaining film per se or to coat the film directly onto a supporting surface such as a paper web.

The invention will hereinafter be described as embodied in a machine for producing polyethylene films or coatings, but it should be understood that the machine of the invention is adapted for use with materials which are plastic when heated, even through they are capable of being hardened by heat. Thus, films and coatings produced by the machine of this invention may be formed of materials which are eventually thermoset, but which are nevertheless thermoplastic when formed into the film or coating.

The equipment of this invention includes a roll and a floating shoe which is urged toward the roll by pneumatic pressure and cooperates therewith to form a converging nip or throat adapted to retain a mass of thermoplastic material and build up a load on the mass as the roll is driven by suitable driving equipment to shear material from the mass through the nip, thereby forming a film. The pneumatic means for urging the floating shoe against the roll are preferably air pressure-urged flexible diaphragms acting on bearings carrying the shoe. The equipment also includes heating rolls for receiving a paper web or the like therearound en route to the nip-forming roll so that the plastic material in the nip will not be chilled by the incoming web, in the event that the web is to be coated by the material. After the coated web leaves the nip, it passes around chill rolls to cool the coated paper.

A feature of the invention resides in the use of resilient pressure to gauge the thickness of the film. The machine of this invention does not require gauges, stops, or other micrometer controls for maintenance of a desired nip gap, since the load built up in the nip by the shearing action of the rotating roll on the plastic material will be sufficient to effectively resist the flexible pressure on the shoe to enable the adjustment of this pressure to be the controlling factor in gauging the thickness of the film.

Another feature of the invention resides in the provision of adjusting shims or wedges along the length of the floating shoe to compensate for any variations in nip gap due to warpage of the shoe.

A still further feature of the invention resides in a floating shoe mounting which accommodates tilting of the shoe without disturbing the nip of the machine so that an unworn shoe surface can be presented to the film gauging or critical portion of the nip, thereby increasing the life of the machine.

It is, then, an object of this invention to provide a film-forming or coating machine which gauges the thickness of the film or coating by adjustable resilient pressure.

A still further object of the invention is to provide a thermoplastic film-forming machine which does not require stops, metering gauges, or the like mechanism for controlling the thickness of the film or coating.

A still further object of the invention is to provide a combined film-forming and coating machine having a nip capable of retaining heated thermoplastic material on the inlet side thereof and having a driven shear means defining a portion of the nip to shear off a film of the plastic material through the nip while gauging the thickness of the film with fluid under pressure.

A specific object of the invention is to provide a film-forming machine having a driven rotating roll and a stationary heated shoe cooperating to define a film-forming nip and including fluid pressure means for urging the roll and shoe toward each other to gauge the width of the nip.

A specific object of the invention is to provide a film-forming machine composed of a driven nip-defining member and a stationary coacting nip-defining member which can be adjusted to present different areas to the critical portion of the nip for compensating against wear.

A still further object of the invention is to provide a film-forming machine utilizing fluid pressure-urged flexible diaphragms to control the thickness of the film.

Another and a specific object of the invention is to provide a coating machine having a stationary shoe coacting with a rotating roll to define a pressure nip wherein the shoe is equipped with wedge devices along its length for compensating against deflection of the shoe to maintain a uniform nip along its entire length and thereby insure production of a uniformly gauged film of any width.

Other and further objects of the invention will be apparent to those skilled in the art from the following detailed description of the annexed sheets of drawings which, by way of a preferred example only, illustrate one embodiment of the invention.

On the drawings:

Figure 2 is a side elevational view of the film-forming machine of this invention.

Figure 3 is a broken top plan view of the machine of Figure 2.

Figure 4 is a fragmentary transverse cross-sectional view taken along the line IV—IV of Figure 3.

Figure 5 is a fragmentary longitudinal view, with parts broken away to show underlying parts and taken substantially along the line V—V of Figure 3.

As shown on the drawings:

Figure 1:
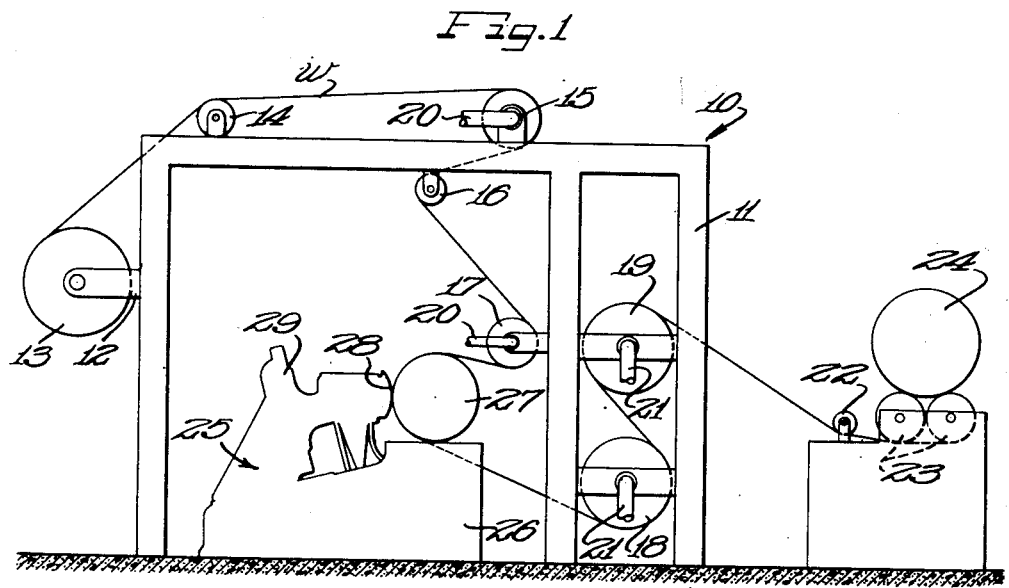
Figure 1 is a somewhat diagrammatic side elevational view showing equipment of this invention for producing a film or coating on flexible web material such as paper.

In Figure 1, the reference numeral 10 designates generally equipment, according to this invention, for producing a thermoplastic film or coating on flexible web material such as paper. The equipment 10 includes suitable framework 11 carrying an unwinding reel 12 for a roll of paper 13, a guide roll 14 for receiving the web W from the roll of paper 13, a steam-heated roll 15 for heating the web W, a guide roll 16 for lapping the web W around the heating roll 15, and a second heating roll 17 receiving the web W from the roll 16. The framework 11 also carries a pair of chill rolls 18 and 19. The heating rolls 15 and 17 can receive steam or other heating fluid through inlet pipes 20, while the chill rolls 18 and 19 can receive refrigerant or other cooling liquid through inlet pipes 21.

The paper web W, after passage over the chill roll 19, is guided under a guide roll 22 and thence under a pair of winder drums 23. The winder drums 23 support and drive a roll 24 for winding the coated web.

Within the framework 11 there is provided the coating machine 25 of this invention. This machine includes a suitable frame 26, a driven nip-defining roll 27, a floating shoe 28, and diaphragm units 29 for urging the shoe toward the roll 27. The paper web W from the heating roll 17 is lapped around the roll 27 to pass through the nip between the roll and the floating shoe en route to the chill roll 18.

As best shown in Figures 2 and 3, the frame 26 for the coating machine 25 includes a pair of side frame members 26a and 26b in spaced parallel relation. These side frames are suitably bolted to the floor or other supporting structure by means of bolts 30. One end of each side frame has a flat top rail supporting a bearing 31 which bearings rotatably carry the axles 27a of the roll 27. One axle 27a extends through its bearing 31 and its extended end has a gear 32 secured thereon for driving the roll. Brackets 33 are also carried by the bearings 31 to support a cross rod 34 which carries a pair of dams 35 that extend into the nip between the roll 27 and the floating shoe 28. The dams 35 are secured to the rod 34 by means of wing nuts 36 and are adjustable along the length of the rod so that the space between the dams can be varied at will.

The shoe member 28 is carried by a hollow beam 37 which has stub shafts or axles 38 at its ends. These axles 38 are supported by arms 39 which are pivoted to the site frames 26a and 26b respectively on pivots 40 that are positioned near the bottoms of the frames in a vertical plane tangent to the periphery of the roll 27 so that swinging of the arms will move the beam 37 and the shoe 28 carried thereby toward and away from the roll periphery. The arms 39 have split bearing caps 39a at their upper ends equipped with draw bolts 41 which will draw the bearings tightly against the axles to lock the beam against relative rotation in the arms.

The outer ends of the axles 38 project through the bearing caps 39a and are keyed to the eye ends 42a of fingers 42. These fingers 42 extend between adjusting bolts 43 carried on the arms 39, and, when the draw bolts 41 are loosened the bolts 43 can be adjusted to shift the fingers 42 for tilting the beam 37 and the shoe 28 carried thereby relative to the arms, for a purpose to be more fully hereinafter described. As shown in Figure 2, the bolts 43 are threaded through lugs 39b on the arm 39.

The frame pieces 26a and 26b have inclined top wall portions sloping downwardly from the flat top portions carrying the bearings 31. These inclined portions provide gibs or ways 44 each carrying a diaphragm unit 45. These units 45 have frames 46 that are keyed on the ways 44 and are equipped with circular housings 46a extending upwardly from the ways and defining air chambers 47. Each housing 46a is covered with a flexible diaphragm 48 composed of tough, impervious sheet material such as a laminated rubber product or the like. Rings 49 clamp the diaphragms 48 to the housings 46a so that the chambers 47 are sealed.

The diaphragms each carry a presser foot 50 with a collar 50a on the outer end thereof receiving a beam axle 38 therethrough. It will thus be apparent that the diaphragms 48 will be effective to swing the beam 37 on its arms 39 toward and away from the roll 27. Since, as best shown in Figure 2, the arms slope backwardly from their pivots 40 toward the diaphragms 48, the weight of the beam and its shoe 28 will be carried by the diaphragms 48 and any load exerted by the shoe 28 in the nip will be accurately controlled by pressure exerted on the diaphragms 48.

Stops 51 are carried on the inclined ways 44 in the path of the arms 39 to limit downward swinging of the arms in the event of release of pressure on the diaphragms 48 so that the weight of the assembly will not tear or stretch the diaphragms.

As shown in Figure 3, air or other fluid under pressure is admitted into the housing portions 46a behind the diaphragm 48 through a main feed pipe 52 controlled by a valve 53. The feed pipe 52 supplies branch pipes 52a each having pressure reducing valves 54 and gauges 55 so that air pressure in each chamber 47 can be accurately controlled. Normally the arrangement will be such that the gauges 55 will show the same pressure reading for causing their diaphragms 48 to exert equal pressure on the shoe 28 carried by the beam 37.

As shown in Figures 2 and 4, the shoe 28 has an arcuate active face 28a preferably struck from a radius R centered at the center point C for the beam axle 38. The shoe has a flat back wall 28b and a T-slot 28c extending along the full length of the shoe and opening through the back wall. A series of passages 28d are formed through the shoe adjacent its active face 28a thereof and these passages contain heating units such as Calrods 56. In place of the Calrod units 56, passages 28d could receive a heating fluid therethrough.

The beam 37 is hollow and, as shown in Figure 4, is composed of four welded together plates. The front plate 47a presents a flat face opposing the back face 28b of the shoe. Aligned pairs of bolt holes 57 are formed through the front and back plates of the beam 37 and each pair receives a bolt 58 freely therethrough. Each bolt 58 has a head 58a seatable in the T-slot 28c of the shoe 28. These bolts support the shoe 28 on the beam 37.

A plurality of wedge fingers 59 are interposed between the front plate 37a of the beam 37 and the rear face 28b of the shoe 28 at each bolt hole in the plate 37a.

As best shown in Figure 5, these wedge fingers 59 have bifurcated ends 59a straddling the shank of each bolt 58 adjacent the head 58a thereof and the portion of the bolt shank passing between the bifurcated ends 59a has flattened sides 58b which loosely mate with the bifurcated ends to prevent rotation of the bolt.

The upper portion of each wedge finger 59 has a rearwardly extending horizontal flange 59b with three bolt holes therethrough including a pair of unthreaded holes receiving bolts 60 freely therethrough. These bolts 60 are threaded into the top plate of the beam 37. Between the bolts 60 there is provided a third bolt 61 in each flange 59b. This bolt 61, however, is threaded through the flange and bottoms against the top plate of the beam 37. It will thus be seen that loosening the bolt 61 and tightening the bolts 60 will force the wedge 59 downwardly while loosening the bolt 60, and tightening the bolts 61 will pull the wedge upwardly.

As shown in Figure 4, the portion of the finger 59 including the bifurcated ends 59a thereof is tapered and gradually increases in thickness from the bifurcated ends toward the flanged end 59b. Therefore, shifting of the finger 59 will effect a wedging action between the front plate 37a of the beam 37 and the rear face 28b of the shoe 28.

The bolts 58 receive nuts 62 on the ends thereof projecting beyond the rear plate of the beam 37. These nuts, when tightened, will draw the heads 58a of the bolts tightly against the wedge fingers 59 and, when loosened, will permit adjustment of the fingers 59 by the use of the bolts 60 and 61, as hereinbefore described. In this manner, any deflection of the shoe 28 along its length can be compensated by adjustment of the wedge fingers 59 so that uniform nip pressure can be maintained along the entire length of the shoe.

When the nuts 62 are loosened, a spring 63 compresses between the back plate of the beam 37 and a washer 64 bottomed on a shoulder of the shank of the bolt 58 will urge the bolt head 58a into the bottom of the T-slot, thereby freeing the shoe 28. Since the T-slot 28c extends along the full length of the shoe, a loosening of all of the nuts 62 will permit sliding the shoe longitudinally off of the beam 37.

As shown in Figures 4 and 5, the top and bottom plates of the beam 37 extend forwardly from the front wall 37a of the beam to provide track portions 37b receiving the top and bottom walls of the shoe 28 in slidable relation so that the shoe can be guided into and out of position on the beam. In order to prevent cocking of the wedge fingers 59, these tracks 37b are cut away at intervals to provide gaps 65 receiving the fingers therein.

As shown in Figure 4, the bottom plate of the beam 37 is apertured at 37c to provide a hand hole giving access to the interior of the hollow beam 37. This hand hole is preferably closed with a cap 66. A series of such hand holes and caps can be provided along the length of the beam.

Figures 6, 7:
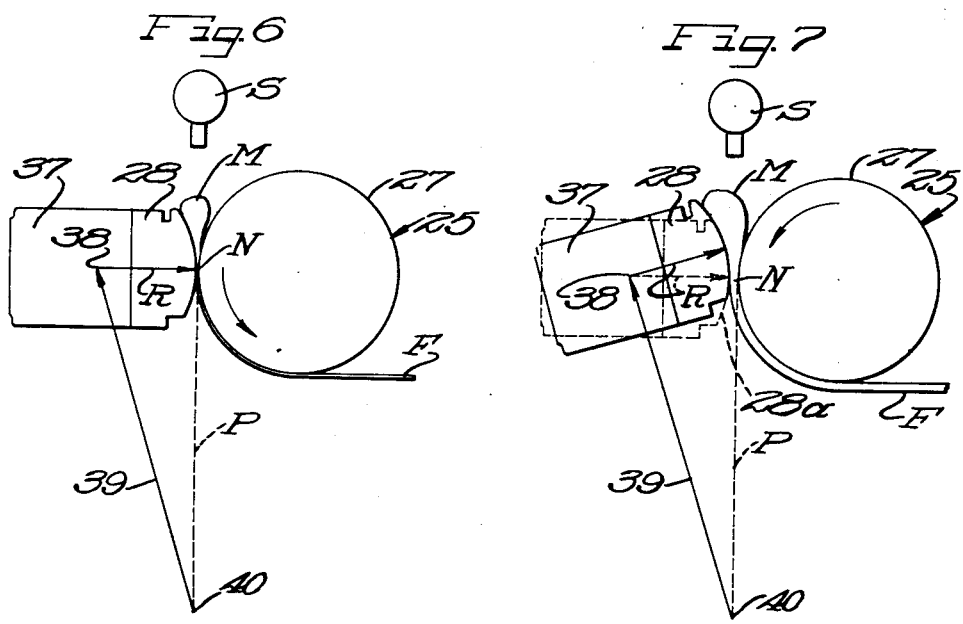
Figure 6 is a somewhat diagrammatic view illustrating the formation of a relatively thin film on the machine of this invention.
Figure 7 is a view similar to Figure 6 but showing the formation of a relatively thick film and also showing the manner in which the floating shoe can be shifted to present a different area to the critical portion of the nip.

As illustrated in Figures 6 and 7, the film-forming machine 25 of this invention has a film-forming nip N between the rotating roll 27 and the stationary floating shoe 28. This nip N is supplied with a mass M of heated viscous thermoplastic material from a suitable source S.

When it is desired to form a relatively thin film, the shoe 28 is urged with an increased force toward the roll 27 thereby closing up the critical portion of the nip. When the roll 27 is driven, the plastic material from the mass M will be sheared from the body of the mass to pass in film form through the nip N on the roll 25 or on a paper web W carried by the roll. It should be understood that the roll 25 can receive the film F directly thereon, or the web W can be lapped around the roll to receive the film as a coating. The nip N converges along the arcuate surfaces of the roll and shoe, so that the shear force built up in the critical or narrow portion of the nip will be quite substantial and be resisted solely by the air pressure on the diaphragm 28. Since the shoe 28 is, in effect, floating on air, any unevenness or looseness in bearings or the like supports for the shoe will not be transmitted to the nip. If any variations occur along the length of the shoe due to wear or stress, the wedge fingers will easily equalize the irregularities to provide a uniform nip along the entire length of the shoe. When it is desired to produce a thicker film, as shown in Figure 7, it is only necessary to decrease the air pressure on the floating shoe 28 so that the shear force or load built up in the nip end will open up the nip to gauge a thicker film.

As illustrated in Figures 6 and 7, the pivot point 40 for the beam 37 carrying the shoe 28 is on a vertical plane P tangent to the periphery of the roll 27 at the critical portion of the nip N. This arrangement makes possible a shifting of the shoe 28 from the solid line to the dotted line position shown in Figure 7 without varying the nip gap, because the active face 28a of the shoe 28 is struck from a radius R centered on the beam axle 38 which is carried by the arm 39. Therefore, the shoe can be tilted to present a new face portion to the critical part of the nip without stopping the machine or interfering with the film formation. As described hereinabove, this tilting of the shoe is effected by shifting the fingers 42 with the adjusting bolts 43.

From the above descriptions, it should be understood that this invention has now provided coating equipment which will directly form thermoplastic material into a self-sustaining film, or will apply a thermoplastic film as a coating on flexible web material such as paper. The film-forming machine includes a driven shear member, preferably in the form of a roll, and a stationary but floating shoe which is resiliently urged toward the driven member under a controlled load. The thermoplastic material in the nip between the floating shoe and the driven member will effectively resist the load on the shoe so that regulation of this load will gauge the thickness of the film. Since a resilient pressure is used to load the shoe, inaccuracies in bearing alignment, looseness of parts, or the like, will not have any effect on the thickness of the film. The machine is also equipped with easily adjusted wedge means along the length of the floating shoe for equalizing any irregularities that might occur along the length of the nip.

It will be understood that modifications and variations may be effected without departing from the scope of the novel concepts of the present invention.

I claim as my invention:

1. Apparatus for forming films from plastic material which comprises opposed members defining a nip, a floating mounting for one of said members, resilient means for supporting the weight of said one member and for urging said one member toward the other of said members, a control for said resilient means to regulate the load in the nip, and means for driving only one of said members while the other member is held against rotation so as to shear off a film from plastic material in said nip.

2. Apparatus for forming films from thermoplastic material which comprises opposed nip-defining members coacting to provide therebetween a nip which will retain a mass of thermoplastic material in flowable tacky condition, means for moving one of said members only to shear thermoplastic material from said mass and convey it through said nip in film form, a floating mounting for one of said members, fluid pressure means acting on said floating mounting to support the weight of said one member carried by said mounting and to urge the one member carried by said floating mounting toward the opposed member, and means for controlling said fluid pressure means to regulate the load exerted by said one member at said nip and thereby gauge the thickness of the film.

3. Apparatus adapted for forming films from thermoplastic material which comprises a roll, a floating shoe coacting with said roll to define a nip capable of retaining a mass of thermoplastic material therein, a pivot arm mounting said shoe for arcuate movement about a pivot point remote from said nip, fluid pressure means supporting the weight of said shoe and loading the shoe about said pivot point toward said roll, means for holding said shoe against rotation and means for driving said roll to shear off a film from a mass of thermoplastic material supported in the nip, and means for controlling the fluid pressure means to regulate the load exerted by said shoe at said nip and thereby gauge the thickness of the film.

4. A film-forming machine comprising a roll, means for driving said roll, a shoe being held against rotation and coacting with said roll to define a nip, a floating mounting for said shoe mounting said shoe for movement relative to said roll in a predetermined arcuate path, and air-loaded diaphragms supporting the weight of said shoe and said mounting and acting on said floating mounting to urge the shoe toward the roll, whereby the thickness of a film forced through said nip by said rotating roll will be accurately gauged in proportion to the air pressure on the diaphragms.

5. A film-forming machine comprising a frame, bearings on said frame, a roll rotatably supported by said bearings, arms pivoted on said frame, a beam carried by said arms, means for tilting said beam relative to said arms, a shoe carried by said beam for coacting with said roll to define a nip, and a pair of air-pressure loaded diaphragms urging said beam toward said roll to control the load in said nip between the shoe and roll.

6. A film-forming machine comprising a roll, a shoe coacting with said roll to define a nip, arms swingably supporting said shoe for movement toward and away from said roll, means for rotating said shoe relative to said arms, and diaphragm means urging said shoe toward said roll to control pressure in the nip between the roll and shoe.

7. A film-forming machine comprising a roll, means for rotating said roll, a floating shoe coacting with said roll to define a nip, means urging said shoe toward said roll to gauge the thickness of a film formed by the machine, and a plurality of separate means along the length of said shoe for individually adjusting the spacing of the shoe from the roll at the location of each of said separate means.

8. In a film-forming machine, the improvement of a floating shoe for coacting with a roll to define a film-forming nip, a pivot arm limiting movement of said shoe relative to said roll to a predetermined arcuate path, means mounted on said pivot arm for holding said shoe against rotation, and fluid pressure-sensitive diaphragms acting on said shoe to load said shoe toward the nip in said arcuate path.

9. A film-forming machine comprising a roll, a floating shoe coacting with said roll to define a film-forming nip and being held against rotation, a beam supporting said shoe, a plurality of bolts connecting the beam and shoe along the length thereof, wedge fingers interposed between the shoe and beam and straddling said bolts, and means for adjusting said wedge members.

10. In a film-forming machine the improvement of a roll, means for rotating the roll, a shoe held against rotation and coacting with said roll to define a film-forming nip, means for heating said shoe, swingably mounted bearings carrying said shoe for movement toward and away from the roll, and a pair of air pressure-sensitive diaphragms acting on said bearings to urge the shoe toward the roll.

11. In a film-forming machine the improvement which comprises a beam, a shoe detachably mounted on the beam and having a T-slot along the length thereof, bolts having heads anchored in said T-slot and shanks extending through said beam, nuts mounted on the ends of the bolts for drawing the shoe against the beam, wedge members interposed between the beam and shoe, means for adjusting the wedge members to control spacing of the shoe from the beam, and springs acting on the bolt to release the bolt head in the T-slot when the nuts are loosened, whereupon the shoe can be longitudinally removed from the beam without removing the bolts or wedges.

12. Apparatus for forming film from thermoplastic material which comprises a rotatable roll, an elongated element held against rotation having an arcuate face coacting with the roll to define therewith a nip, means urging said element toward said roll, and adjustable means acting on said element at points spaced longitudinally of the length thereof to control the spacing of the element from the roll at each of said points.

13. Apparatus for forming film from thermoplastic material which comprises a roll, a floating shoe coacting with said roll to define a nip capable of retaining a mass of thermoplastic material therein, a pivot arm mounting said shoe for arcuate movement about a pivot point remote from said nip, fluid pressure means supporting the weight of the shoe and loading the shoe about said pivot point toward said roll, means for holding said shoe against rotation, means for driving said roll to shear off a film from a mass of thermoplastic material supported in the nip, and means for controlling the fluid pressure means to regulate the load exerted by said shoe at said nip and thereby gauge the thickness of the film.

LLOYD HORNBOSTEL.

References Cited in the file of this patent

UNITED STATES PATENTS

| Number | Name | Date |
|---|---|---|
| 616,434 | Coulter | Dec. 20, 1898 |
| 844,350 | Hale | Feb. 19, 1907 |
| 1,043,021 | Mayer | Oct. 29, 1912 |
| 1,358,614 | Boecler | Nov. 9, 1920 |
| 1,406,919 | Boecler | Feb. 14, 1922 |
| 1,664,273 | Theroux | Mar. 27, 1928 |
| 1,957,518 | Woock | May 8, 1934 |
| 2,020,687 | Kinsella | Nov. 12, 1935 |
| 2,045,328 | Levey | June 23, 1936 |
| 2,117,200 | Miller | May 10, 1938 |
| 2,396,946 | Grupe | Mar. 19, 1946 |
| 2,470,400 | Hornbostel | May 17, 1949 |